United States Patent [19]
Bennett

[11] Patent Number: 4,733,960
[45] Date of Patent: Mar. 29, 1988

[54] LENS ADAPTER FOR CREATING PHOTOGRAPHICALLY REPRODUCED DESIGNS WITH TURNABLE MIRROR TUBE

[76] Inventor: Carolyn Bennett, 123 E. 4th St., Media, Pa. 19063

[21] Appl. No.: 933,036

[22] Filed: Nov. 20, 1986

Related U.S. Application Data

[63] Continuation-in-part of Ser. No. 771,787, Sep. 10, 1985, abandoned.

[51] Int. Cl.⁴ .............................................. G02B 27/08
[52] U.S. Cl. ...................................................... 353/1
[58] Field of Search ................. 353/1, 2; 350/4.1, 4.2

[56] References Cited

U.S. PATENT DOCUMENTS

| | | | |
|---|---|---|---|
| 1,595,627 | 8/1926 | Seymour | 353/1 |
| 1,944,111 | 1/1934 | Schieren | 353/1 |
| 2,464,055 | 3/1949 | Papke | 353/2 |
| 3,100,418 | 6/1963 | Posner | 353/2 |
| 3,111,878 | 11/1963 | Welles | 353/2 |
| 3,661,439 | 5/1972 | Burnside | 333/1 X |

FOREIGN PATENT DOCUMENTS 796102 6/1958 United Kingdom ................. 350/4.1

*Primary Examiner*—Harry N. Haroian
*Attorney, Agent, or Firm*—Barbara C. Siegell; Robert S. Lipton; Robert B. Famiglio

[57] ABSTRACT

This invention is a combination lens and teleidoscope/kaleidoscope device for use in creating special photographic effects by enabling the user to take close-up photographs of Kaleidoscopically and Teleidoscopically produced designs. The device is adapted by means of a series of fittings, for attachment to a camera. A turnable mirror tube located within one embodiment of the device, allows a user to control the composition of his photograph without physically moving the camera itself or the design producing element.

7 Claims, 4 Drawing Figures

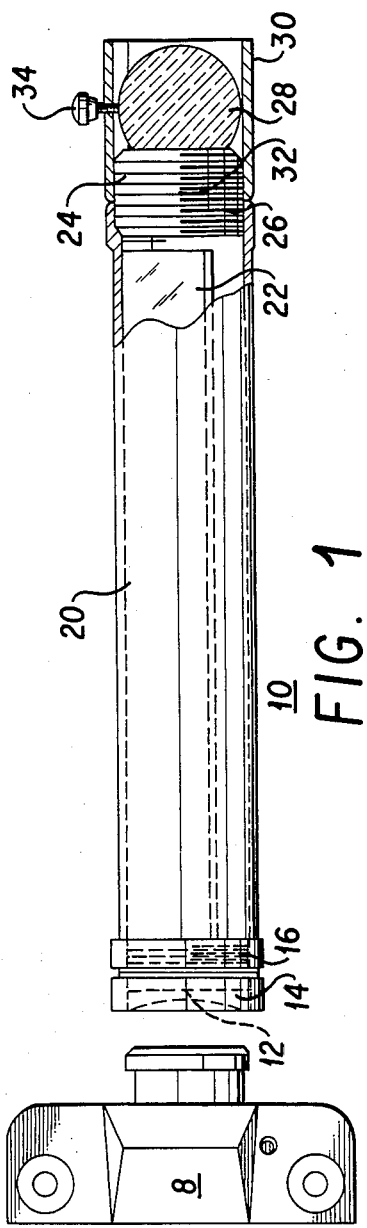
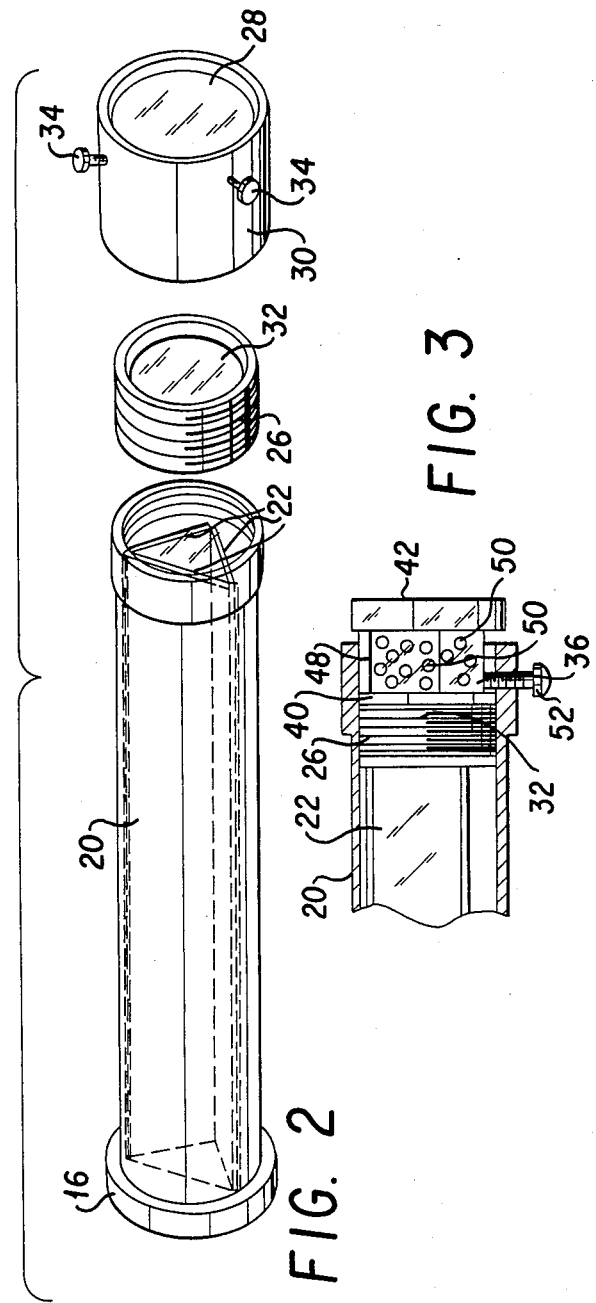
FIG. 1
FIG. 2
FIG. 3

LENS ADAPTER FOR CREATING PHOTOGRAPHICALLY REPRODUCED DESIGNS WITH TURNABLE MIRROR TUBE

BACKGROUND OF THE INVENTION

This application is a continuation-in-part of an earlier filed U.S. patent application Ser. No. 771,787 filed on Sept. 10, 1985 entitled LENS ADAPTER FOR CREATING PHOTOGRAPHICALLY Reproduced Designs now abandoned.

BACKGROUND OF THE INVENTION

1. Field of the Invention

The present invention pertains to the creation of unique photographic effects through the taking of close-up photographs of Kaleidoscopic and Teleidoscopic patterns. More particularly, the invention relates to the combination of a lens of a camera, with a close up lens connected to a kaleidoscope or a teleidoscope with either a turnable or non-turnable mirror tube that enables the user to instantly photograph a design in enlarged form. The turnable mirror tube arrangement of the preferred embodiment of the invention allows a user to compose the picture that he or she wishes to memorialize by turning the mirrors rather than changing the position of the camera or the design producing element.

Kaleidoscopes have been known in the art since the 19th century. A kaleidoscope consists of a tube that has an "object box" at one end and is closed at the other end, except for a small peephole for viewing. Inside the tube of the conventional kaleidoscope are two or more mirrors extending down the entire length of the tube and slanting toward each other. At the "object box" end of the mirrored tube, the outside end of the box is composed of a translucent material such as a ground glass plate. The inside plate of the "object box" is made of transparent material such as clear glass. Pieces of colored glass, beads or other objects are placed between the plates of the object box. The kaleidoscope works on the principle of multiple reflection. The objects in the box are reflected in the slanted mirrors to produce symmetrical patterns which are viewed through the peephole. When the kaleidoscope is turned, the pieces shift position and the reflected patterns change.

A modification of the above described simple kaleidoscope was reportedly introduced by Sir David Brewster, who patented the original kaleidoscope, in the 19th Century. He replaced the "object box" on the end of the kaleidoscope with a double convex lens, while retaining the slanted mirrors in the tubular housing, so that the world, as distorted by the lens, became the symmetrical pattern that was reflected by the mirrors. Such a modified kaleidoscope is called a Teleidoscope.

In his comprehensive, *Treatise on the Kaleidoscope*, published by Archibald Constable & Co. in Edinburgh, in 1819, Sir David Brewster recommended that the symmetrical patterns produced by the kaleidoscope be used in various fields of design, especially in ornamental architecture, paintings and rug designs. However, reproduction of such designs has remained a problem as minor movement of the scope results in changes in the configuration of the objects viewed. The present invention avoids this problem by allowing instantaneous and enlarged photographs of the design viewed to be produced. Changes in configuration of the objects to be viewed are avoided by use of a turnable mirror arrangement. By allowing the camera to remain fixed on a tripod or other stable structure, and the object box or lens box to remain stationary, and by turning the mirrored tube, picture composition is facilitated.

2. Description of the Prior Art

Kaleidoscopes and Teleidoscopes of various types are known in the art. Various patents have devised improvements in the retention and placement of mirrors within the tubular casings of kaleidoscopes. U.S. Pat. No. 3,131,593 by H. B. Grow, for example, teaches circular supporting devices for a three mirror scope. Other patents have addressed ornamental designs for kaleidoscopes. See, for example, U.S. Pat. No. 234,863 and U.S. Pat. No. 203,401. Prism and other multiple image lenses are also known in the art.

One known photographic accessory, for use with a standard camera lens, uses a tubular housing with plates of transparent glass at either end. Inside the housing are three mirrors slanted toward each other. The mirrors create a multiple image effect of the world as it actually exists. Unlike the present invention, it does not use a double convex lens effect to distort the image. Fittings attach this accessory to a camera's standard lens. No close-up lens is used.

Several patents have been located which address the problem of photographing an image through a mirrored tube. British Pat. No. 796,102 by William Davies, for example, teaches a combination of a camera with a tube having mirrors inside. Light hitting a design from a rotatable table located below and separate from the tube that is connected to the Camera is reflected in the mirrors and photographed by the attached camera. Unlike the present applicant's invention, the Davies patent does not employ a close-up lens or use a turnable mirror tube in order to facilitate composition adjustment. Further unlike the teleidoscope embodiment of the present applicant's invention, the items on the table constitute the subject matter of the photograph. U.S. Pat. No. 1,595,627 by F. Seymour teaches the use of a motion picture camera with a Kaleidoscope located in front of the camera. When rays of light are projected in the kaleidoscope, they are reflected by the mirror to the motion picture camera. The kaleidoscope can be rotated to create special effects. The teaching of Seymour is different from present applicant's invention in that Seymour's is made for a motion picture camera and requires movement of the design producing elements. In Seymour, there is the ability to rotate the whole kaleidoscope section of the invention as the movie camera is activated so as to create the effect of multiple colored moving objects. The present invention is aimed at photographing a still image. In the present invention only the mirror tube moves while both the camera and image box remain stationary. U.S. Pat. No. 3,100,418, by W. Posner, is an optical apparatus for producing "ever changing designs through use of a mirror and lens effect".

U.S. Pat. No. 2,464,055 by Papke, discloses a two mirrored Kaleidoscope with groves within the kaleidoscope's cylinder for placement of the circular sections of the "object box". U.S. Pat No. 3,661,439, by Burnside discloses a Telescopic Kaleidoscope attachment for a photographic camera.

However, none of the kaleidoscopic, teleidoscopic or photographic devices located by our search have suggested the use of a "close-up" lens in combination with a rotatable tubular mirror housing, for rotation within another tubular structure and having interchangeable teleidoscopic and kaleidoscopic fittings, as taught by the combination of the instant invention. Further, none of the patents reviewed allow the user the manual control of the mirrors' rotation as does one embodiment of the present applicant's invention.

SUMMARY OF THE INVENTION

The primary object of the present invention is to provide a novel means of taking enlarged photographs of Kaleidoscopic and Teleidoscopic designs that is easy to use and install on most cameras that accept accessory close-up lenses. The present invention achieves these objects in its preferred embodiment, combining a close-up lens for a camera, chosen so that it focuses at 8 inches, a first, transparent filter, adapted to fit and to attach to said close up lens, a step down ring, connected to the transparent filter, a turnable tubular casing with 2 or more mirrors arranged and connected to each other at angles which extend along the length of the casing, a means for manually rotating the mirrors, a second transparent filter, adapted for attachment to said tubular casing and plurality of cylindrical shaped cups or holders, not limited to the 2 examples that follow, adapted to interchangeably connect to the end of said second clear transparent filter.

One example of such a cup or holder is a Kaleidoscopic "object box", composed of top and bottom glass plates, one of which is made of a translucent material such as ground glass and one which is made of transparent material, surrounded by a casing. Objects of various kinds, such as beads or glass, are retained so that they can move around between the plates of the casing. The transparent end is attached to the clear filter at the end of the mirrored casing, opposite from the end of the tubular casing attached to the camera. The translucent end of the object box is located at the outside end of the accessory.

Another example of a cylindrical cup or holder attachment contains a spherical ball which acts as a double convex teleidoscope lens, surrounded by a casing.

Other objects and advantages of the present invention will become more apparent from the following description of the preferred embodiments, taken in conjunction with the accompanying drawings.

BRIEF DESCRIPTION OF THE DRAWINGS

FIG. 1 shows a side view of the invention with a teleidoscopic attachment.

FIG. 2 shows a cross-sectional view of the tubular housing containing mirrors at angles to each other.

FIG. 3 shows a cross-sectional view of the object box.

DESCRIPTION OF THE PREFERRED EMBODIMENTS

Figure 4:
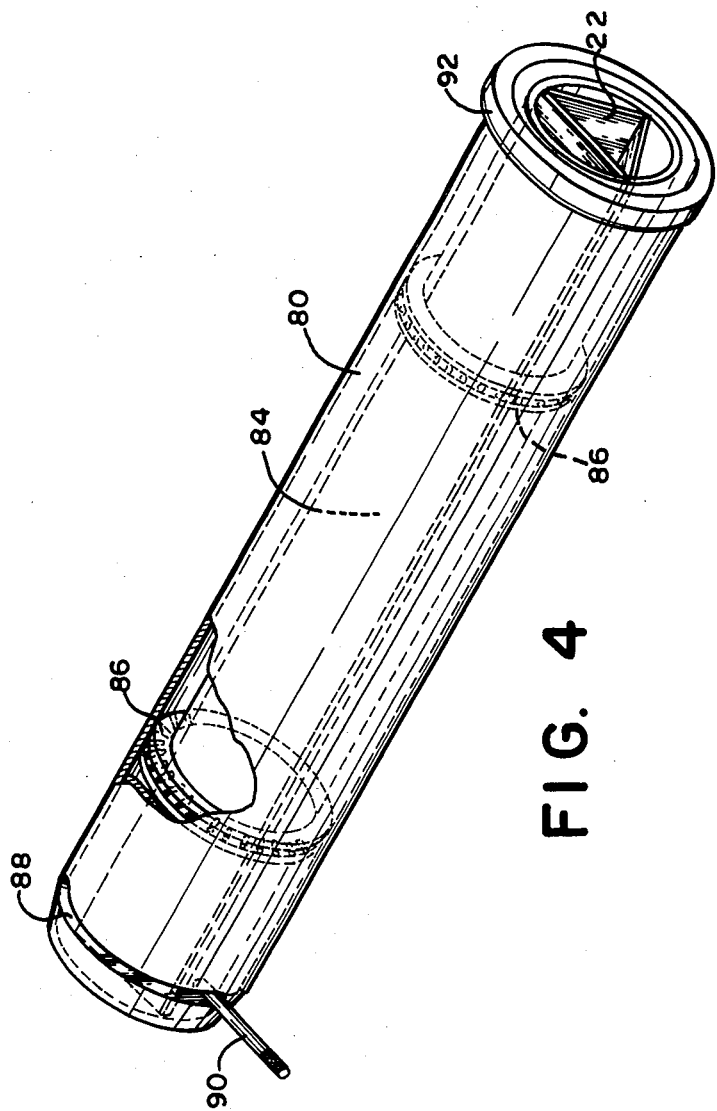
FIG. 4 shows a turnable mirror tube.

FIG. 1 shows the device (10) ready to be attached to a basic camera 8 (not part of the invention). Close up lens 12, with a focal distance of from 7–12 inches in length is connected to a clear filter 14, which serves to protect the lens. A step down ring 16, attaches to the lens 12 and adapts the lens fitting to fit a casing 20. Casing 20 contains a plurality of two or more mirrors 22, (three in the preferred embodiment, but the invention is not limited to three) that extend the length of casing 20. As shown in FIG. 4, the mirror section may be rotatable. A clear filter 32 is connected to the second end of the casing 20, by fitting 26. Ball lens 28, fitted within a casing 30, is attached by means of interim fitting 24 to the clear filter. Screw 34 serves to tighten the casing about the ball lens.

FIG. 2 shows a perspective view of casing 20 containing (three) mirrors 22. Although these mirrors are slanted at angles of 60 degrees in relation to each other in the preferred embodiment, other embodiments may vary the angles of the mirrors to produce desired photographic effects. When it is desired to produce a kaleidoscopic photograph, ball lens 28 along with its casing 30 is removed by screwing it off and object box 36, shown in FIG. 3, is fitted onto clear filter 32.

FIG. 3 shows object box 36 that has a transparent plate 40 on one end and a translucent plate, 42 such as a ground glass, at the other end of casing 48. The plates can be removed to add and replace objects 50 in the object box 36. Objects 50 are a size that can freely move between the plates 40 and 42. Thumb screw 52 secures the box to the end of casing 20.

FIG. 4 shows a turnable mirror tube that can replace mirror tube 20 in FIG. 2, for use in a second embodiment of the invention. By making the mirror section of the device turnable, a user can have better control of the composition to be photographed and avoid minor movements of the camera and of the design producing elements. Outer tube 80, that is equipped with fittings to attach it to the kaleidoscope or teleidoscope boxes 36 and 28, contains inner tube 84. Inner tube 84 has two or more mirrors that extend the length of tube 84. Needle bearings 86 facilitate tbe turning of inner tube 84 within outer tube 80. Projecting from slot 88 of outer tube 80 is a handle 90 that is attached to inner tube 84. When the handle 90 is moved horizontally within slot 88, it enables inner tube 84 to turn, up to 180 degrees, within outer tube 80. Outer tube 80 attaches to camera 8 by means of fitting 92.

In that the present invention is subject to many variations, modifications and changes in detail, it is intended that all subject matter discussed in the specifications as shown in the drawings be interpreted as illustrative and not as limiting this matter.

What is claimed is:

1. A photographic accessory, for creating special photographic effects by means of a unique kaleidoscope arrangement, comprising the following elements:

a first transparent filter which attaches to a lens of a standard camera and which serves to protect said lens; a close-up lens which has means for attachment to the first transparent filter and which also attaches to a stepdown ring that adapts said close-up lens so that it is able to connect the lens to a first cylinder; a first elongated cylinder on which said step down ring is mounted;

a second cylinder, that is smaller than the first cylinder, that is located inside the first cylinder and that is mounted by means of needle bearings within said first cylinder so that it is turnable within the first cylinder and which contains on its inside surface a plurality of oblong mirrors that are slanted toward each other so that they form an enclosure within the second cylinder;

a second transparent filter which attaches to the end of the first cylinder located at the opposite end from the camera attachement end and which has a housing that connects the first cylinder containing the second cylinder to a cup or holder for housing interchangeable design producing means that are constructed to permit light from outside the accessory to shine through the design producing means and to project patterns from the design producing means so that the patterns are reflected by the slanted mirrors that are housed within the second cylinder and projected on the film inside an attached camera.

2. A photographic accessory as described in claim 1 wherein the close-up lens is constructed so that it permits focus at 7 at 12 inches in length.

3. A photographic accessory, as described in claim 1 wherein the second cylinder that houses oblong mirrors has three oblong mirrors inside it.

4. A photographic accessory, as described in claim 3, wherein the lengths of the first cylinder and of the second cylinder are 7 to 12 inches so that they are proportional to the focal length of the close-up lens.

5. A photographic accessory, as described in claim 4, wherein one of the interchangeable design producing means that attach to the second transparent filter described in claim 1 is a cylindrical object box that has a transparent end connected to the second transparent filter and a translucent end open to receive light from sources outside the accessory and that directs light through the object box and into the second cylinder so that the design images are reflected by the mirrors and so that they reach the film on the camera end of the cylinder.

6. A photographic accessory, as described in claim 4 wherein one of the design producing means that attach to the second transparent filter is a ball lens, in a cylindrical housing, for creating distorted images of the objects outside the ball lens, so that such images are transmitted through the ball lens, reflected by the mirrors located in the second cylinder and reach the film of the camera.

7. A photographic accessory, as described in claim 4 wherein the second cylinder is attached to a handle means that projects through the first cylinder and through an almost circular horizontal slot located on the circumference of the first cylinder so that the handle can move the second cylinder from outside the first cylinder.

* * * * *

UNITED STATES PATENT AND TRADEMARK OFFICE
CERTIFICATE OF CORRECTION

PATENT NO. : 4,733,960
DATED : March 29, 1988
INVENTOR(S) : Carolyn Bennett

It is certified that error appears in the above-identified patent and that said Letters Patent are hereby corrected as shown below:

Column 5, line 9, that portion of the Claim reading "focus at 7 at 12 inches in length" should read -- focus at 7 to 12 inches in length.

Signed and Sealed this

Twenty-sixth Day of July, 1988

Attest:

DONALD J. QUIGG

*Attesting Officer*   *Commissioner of Patents and Trademarks*